(12) United States Patent  
Albrich et al.

(10) Patent No.: US 6,429,554 B1
(45) Date of Patent: Aug. 6, 2002

(54) ELECTRIC MOTOR

(75) Inventors: Reinhard Albrich, Dornbirn; Elmar Fuchs, Bregenz, both of (AT)

(73) Assignee: Innova Patent GmbH, Bregenz (AT)

( * ) Notice: Subject to any disclaimer, the term of this patent is extended or adjusted under 35 U.S.C. 154(b) by 0 days.

(21) Appl. No.: 09/685,910

(22) Filed: Oct. 10, 2000

(30) Foreign Application Priority Data

Oct. 11, 1999 (AT) ................................................ 1719/99

(51) Int. Cl.$^7$ ........................ H02K 19/12; H02K 29/00; H02P 7/00
(52) U.S. Cl. ...................... 310/68 R; 310/112; 310/179; 310/254; 310/162; 310/180; 318/105; 318/495
(58) Field of Search ................... 318/105, 106, 318/107, 108, 494, 495, 500, 496, 498; 310/160, 179, 180, 184, 68 R, 112, 254, 162; 363/174

(56) References Cited

U.S. PATENT DOCUMENTS

| | | | |
|---|---|---|---|
| 2,993,134 A | * 7/1961 | Harvey | 310/154 |
| 3,603,866 A | * 9/1971 | Opal | 321/45 R |
| 4,743,828 A | * 5/1988 | Jahns et al. | 318/810 |
| 4,963,778 A | * 10/1990 | Jensen et al. | 310/68 D |
| 5,331,862 A |   7/1994 | Baginski et al. | 74/89.22 |
| 5,760,507 A | * 6/1998 | Miller et al. | 310/74 |
| 6,021,057 A | * 2/2000 | Linden et al. | 363/65 |
| 6,150,731 A | * 11/2000 | Rinaldi | 290/1 A |

FOREIGN PATENT DOCUMENTS

| | | | |
|---|---|---|---|
| DE | 4014848 A1 | 11/1991 | B60L/13/02 |
| WO | WO 8300851 A1 | 3/1983 | B63H/21/12 |
| WO | WO 9011641 A1 | 10/1990 | H02K/37/04 |
| WO | WO 9808291 A1 | 2/1998 | H02K/3/16 |

* cited by examiner

Primary Examiner—Burton S. Mullins
(74) Attorney, Agent, or Firm—Lorusso & Loud

(57) ABSTRACT

An electric motor having a stationary annular stator with wound stator poles and a rotatably mounted rotor having annularly distributed permanent magnets or electromagnets of alternate polarity, wherein the stator is composed of a plurality of separate stator segments with their own, preferably three-phase current connections, wherein each stator segment is fed by way of the respective current connections from its own frequency converter.

19 Claims, 4 Drawing Sheets

ELECTRIC MOTOR

BACKGROUND OF THE INVENTION

The invention concerns an electric motor having a stationary annular stator with wound stator poles and a rotatably mounted rotor having annularly distributed permanent magnets or electromagnets of alternate polarity. The invention further concerns a cable drive having a driven cable guide pulley.

Electric motors have hitherto already been used in cableway drives, in particular in regard to lift systems (cableway systems with people transport). Hitherto the failure of the electric motor involved the necessity of switching over to an emergency drive which for example was diesel-driven in order to be able to evacuate the cableway system. During those change-over procedures which generally take up a great deal of time, the passengers had to wait in the cablecars or cabins or on the chairs, which in winter can result in the passengers suffering from hypothermia.

SUMMARY OF THE INVENTION

An object of the invention is to provide an electric motor which in particular is suitable for cableway drives, which is highly reliable in operation and which therefore entails a high level of availability.

In accordance with the invention, in an electric motor of the general kind set forth in the opening part of this specification, that is achieved in that the stator is composed of a plurality of separate stator segments with their own, preferably three-phase current connections, wherein each stator segment is fed by way of the respective current connections from its own frequency converter.

In that respect it is advantageous if each stator segment is of a multi-pole configuration, wherein the winding lines are taken in series or parallel over at least two poles. In that way it is possible to provide a structure in which each stator segment forms the stator of its own, preferably permanently excited synchronous machine which in principle is capable of running on its own.

In that way it can be provided that, in the event of failure of one or more stator segments (for example due to a winding short-circuit or failures in the associated frequency converter) the electric motor can continue to run generally, without additional measures. The situation then only involves a reduction in the power or torque of the overall electric motor to the stator segments which are then in operation. In practice between three and ten and preferably between four and six such stator segments will be provided.

By way of a relay or contactor in the feed lines between the frequency converter and the stator segment, it is possible to protect the respective frequency converter of a failed stator segment from damaging feedback effects. An electronic monitoring system which for example monitors the current to the individual stator segments can detect the failure of stator segments and indicate same to the operator for example on a display panel.

The structure according to the invention of the stator made up of a plurality of stator segments with their own current connections, in the case of an electric motor with a stationary annular stator having wound stator poles and a rotatably supported rotor, makes it possible for same to be constructed even with relatively large dimensions (for example diameters of two or more meters) and also on geographically difficult routes if the stator segments are each in the form of respective separate modular structural units which are releasably secured independently of each other to a stator carrier. Those structural units can then be easily transported for example by means of a helicopter to the mountain top station of a cableway system and assembled on site to form a stator of the electric motor. Even in the event of failure of such a stator segment unit, it can be easily and simply replaced. That means that stockkeeping is also reduced.

As already mentioned the electric motor according to the invention is suitable in particular for cableway drives, in which respect it is possible for the cable guide pulley itself or a part which is non-rotatably connected thereto to be in the form of the rotor of the electric motor. It is however also possible for the electric motor to be connected to the cable guide pulley in per se known manner by way of a transmission.

Further advantages and details of the invention are described in greater detail with reference to the specific description.

DESCRIPTION OF THE PREFERRED EMBODIMENT

Figure 1:
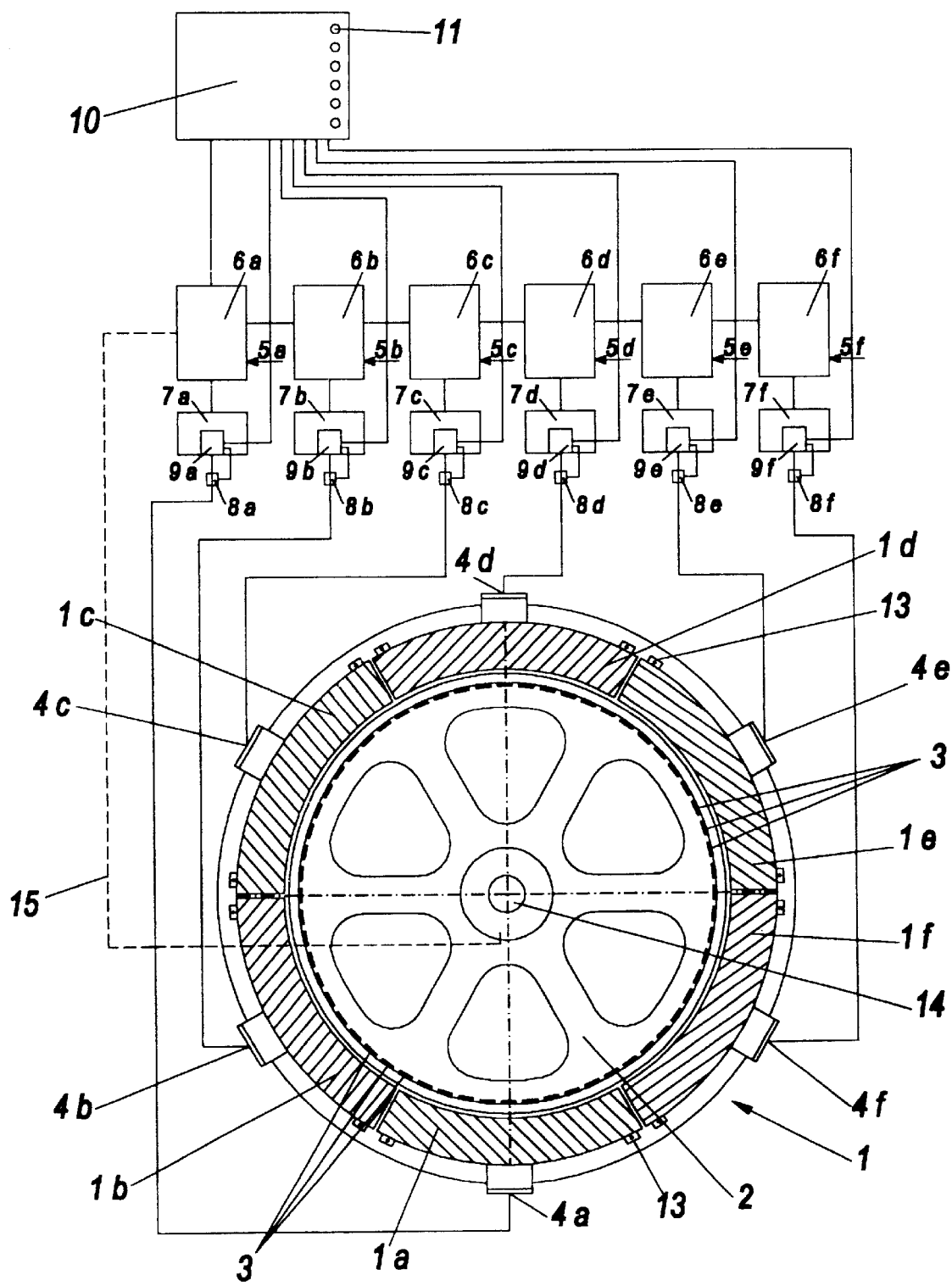
FIG. 1 shows the diagrammatic structure of an embodiment of an electric motor according to the invention.

The electric motor shown in FIG. 1 has a stationary annular stator generally identified by reference numeral 1, with wound stator poles, for generating a rotating field.

The arrangement also includes a rotatably supported rotor 2 which is provided with permanent magnets of alternate polarity, which are distributed about its periphery in an annular array. Those permanent magnets are identified by reference numeral 3 and can be made for example from ferrite material, samarium-cobalt material or iron-neodymium material.

In accordance with the invention the stator 1 now comprises a plurality of separate stator segments 1a, 1b, 1c, 1d, 1e and 1f which each have their own respective current connections 4a through 4f. The current connections or the lines are only diagrammatically illustrated here. In a system involving a feed with three-phase current, for each stator segment 1a through 1f there will be provided a three-phase feed line and a three-phase discharge line as can be seen for example from the winding diagram in FIG. 3. The discharge line can be brought together internally to a star point (optional).

In terms of structure each stator segment can substantially correspond to its own, preferably permanently excited synchronous machine, wherein each stator segment is of a multi-pole nature and the winding lines are taken in series or parallel over at least two poles in order generally to produce the desired rotating field.

As can be seen from FIG. 1 each stator segment 1a through 1f is fed by way of the respective current connections 4a through 4f by its own frequency converter 5a through 5f, each frequency converter in per se known manner having a control portion 6a through 6f and a power portion 7a through 7f. The control portions 6a through 6f are connected together in the manner of a master-slave function, the control portion 6a performing the master function. In the event of failure of 6a, each of the control portions 6b through 6f can freshly assume the master function so that the arrangement involves optimum redundancy. The power portions 7a through 7f are independent of each other and respectively actuated only by their own control portion 6a through 6f in order to supply the current to the individual stator segments 1a through 1f.

In the event of failure of a stator segment 1a through 1f or the associated frequency converter 5a through 5f the electric motor remains fully operational, which is of great significance in particular when used in connection with cableway systems. The situation only involves a reduction in the torque or the power output, corresponding to the failure of the respective portion.

In order to protect the frequency converters 5a through 5f from troublesome feedback effects, incorporated into the feed lines are relays or contactors 8a through 8f which are controlled for example in dependence on a current detection device 9a through 9f, in such a way that in the event of collapse of the current, the respective relay opens immediately. The current detection device 9a through 9f represents part of an electronic monitoring system which for example can indicate to the operator which stator segment has failed, at the display panel of a main control apparatus 10, by way of displays 11.

The desired motor parameters (such as for example the speed of rotation) are predetermined for the control portion 6a (master) by way of the main control device 10. The structure of the frequency converters can essentially correspond to the state of the art in relation to permanently excited synchronous machines.

The state of the art also includes a so-called resolver 14 (rotary angle sensor) which detects the angular position of the rotor 2 and transmits same to the master converter 6a by way of a resolver line 15.

A further aspect of the invention provides that the electric motor according to the invention is not only electrically subdivided into segments, as described hereinbefore, but that the stator segments are also mechanically in the form of separate modular structural units which can be releasably secured independently of each other to a stator carrier 12, for example by way of diagrammatically illustrated screw connections 13. In that way it is possible for the electric motor to be constructed on a modular basis on site and in the event of failure of a stator segment for that stator segment to be replaced quickly and easily.

Figure 2:
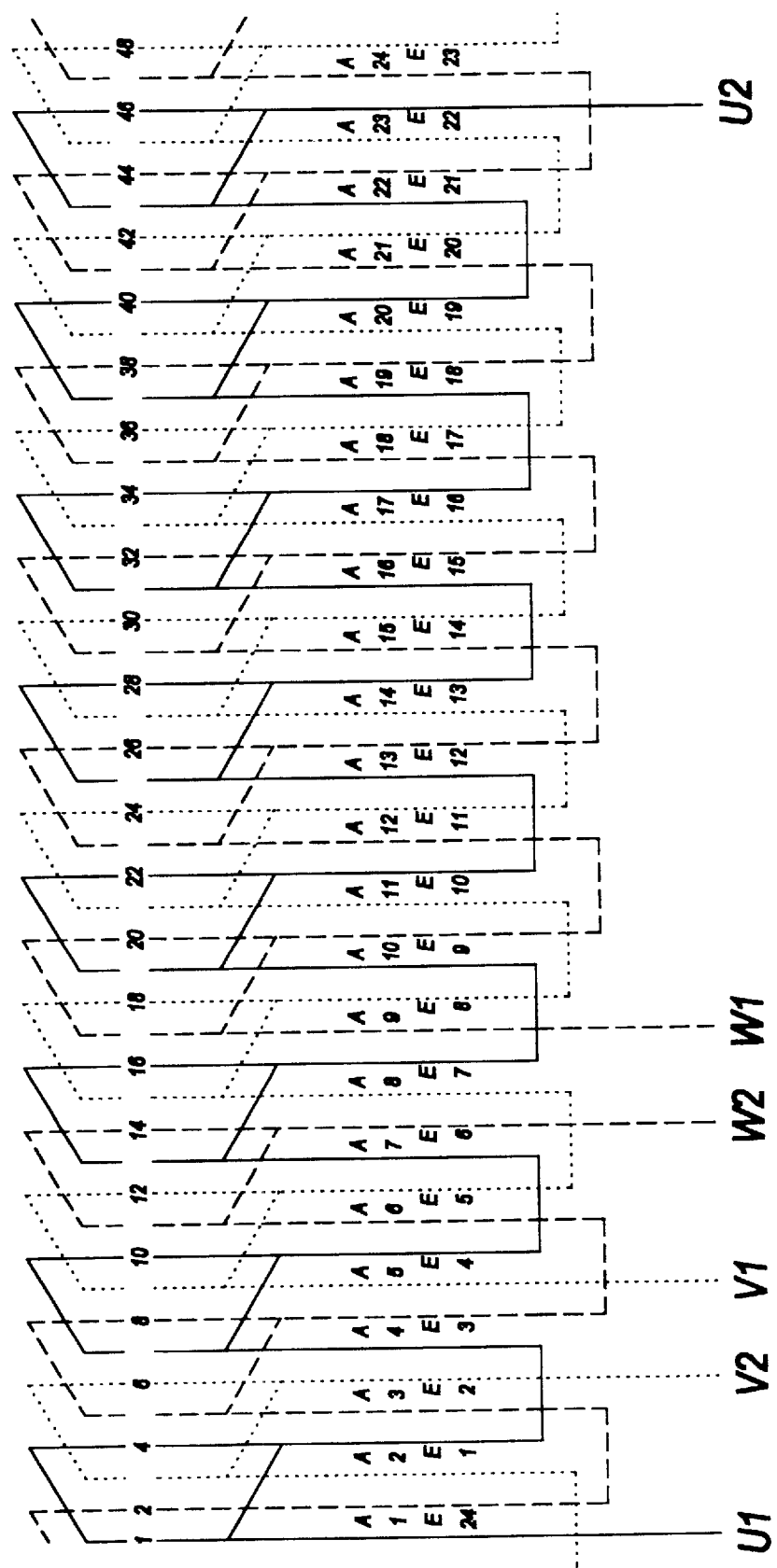
FIG. 2 shows the winding diagram of a 16-pole permanently excited synchronous machine in accordance with the state of the art.

FIG. 2 shows a winding diagram of a 16-pole permanently excited synchronous machine in accordance with the state of the art, in which therefore the stator is not subdivided into segments.

Figure 3:
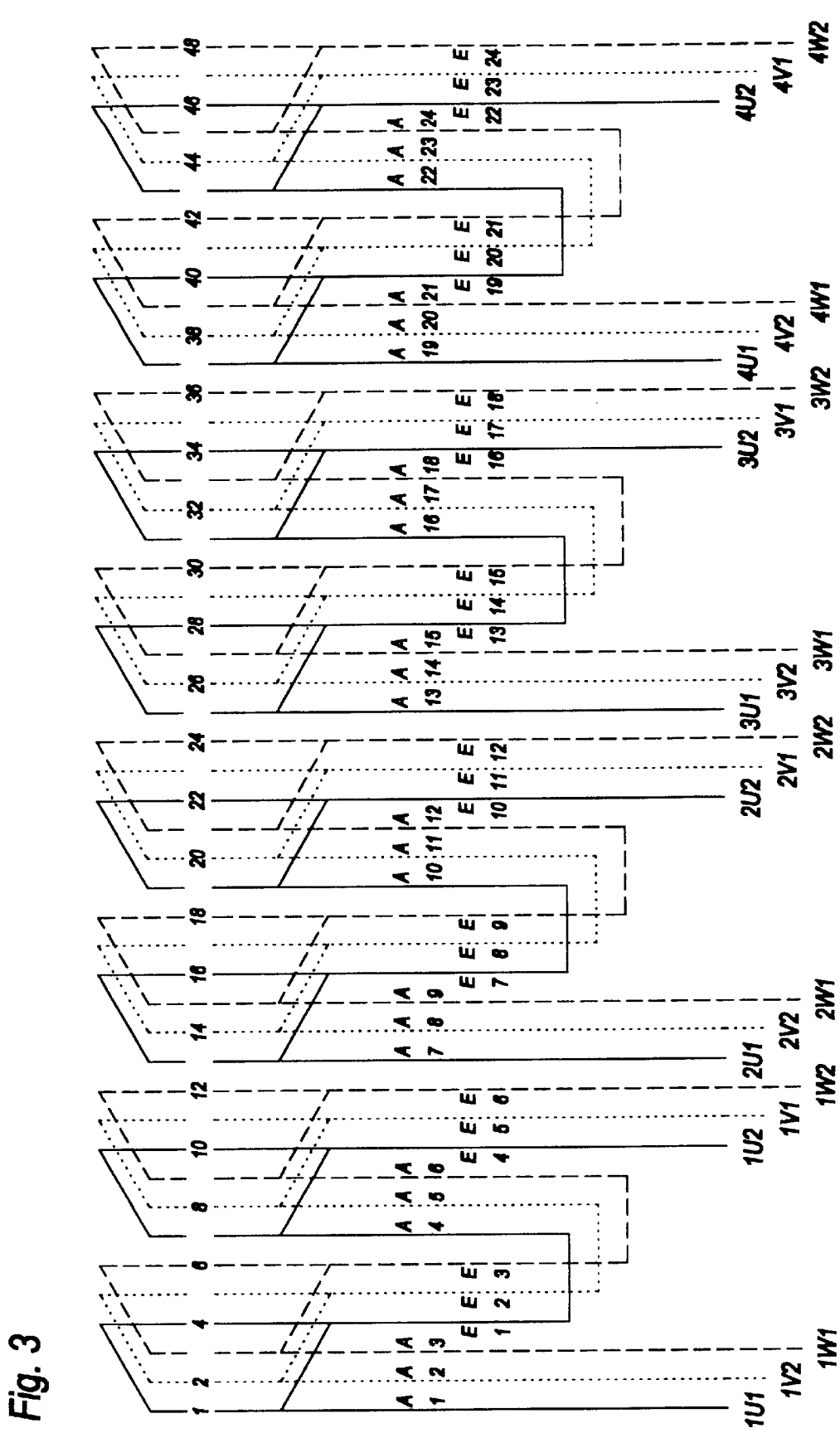
FIG. 3 shows a modified winding diagram for a permanently excited synchronous machine according to the invention, in which the stator is subdivided into four stator segments which each have their own connections.

In comparison, FIG. 3 shows a winding diagram of a 4×4-pole machine according to the invention which has four stator segments. It will be seen that, after 4 poles, no winding lines go further, but they can be taken out. It is therefore possible for the individual stator segments to be electrically independently wired up, each with 4 poles, and preferably—as already mentioned above—also mechanically separated in a modular configuration. The manner of winding shown in FIG. 3 admittedly has a plurality of crossing points, but it allows the segmented or modular structure according to the invention.

It will be appreciated that other winding diagrams can naturally certainly also be envisaged and are possible. The invention is also not limited to three-phase rotary current systems.

Figure 4:
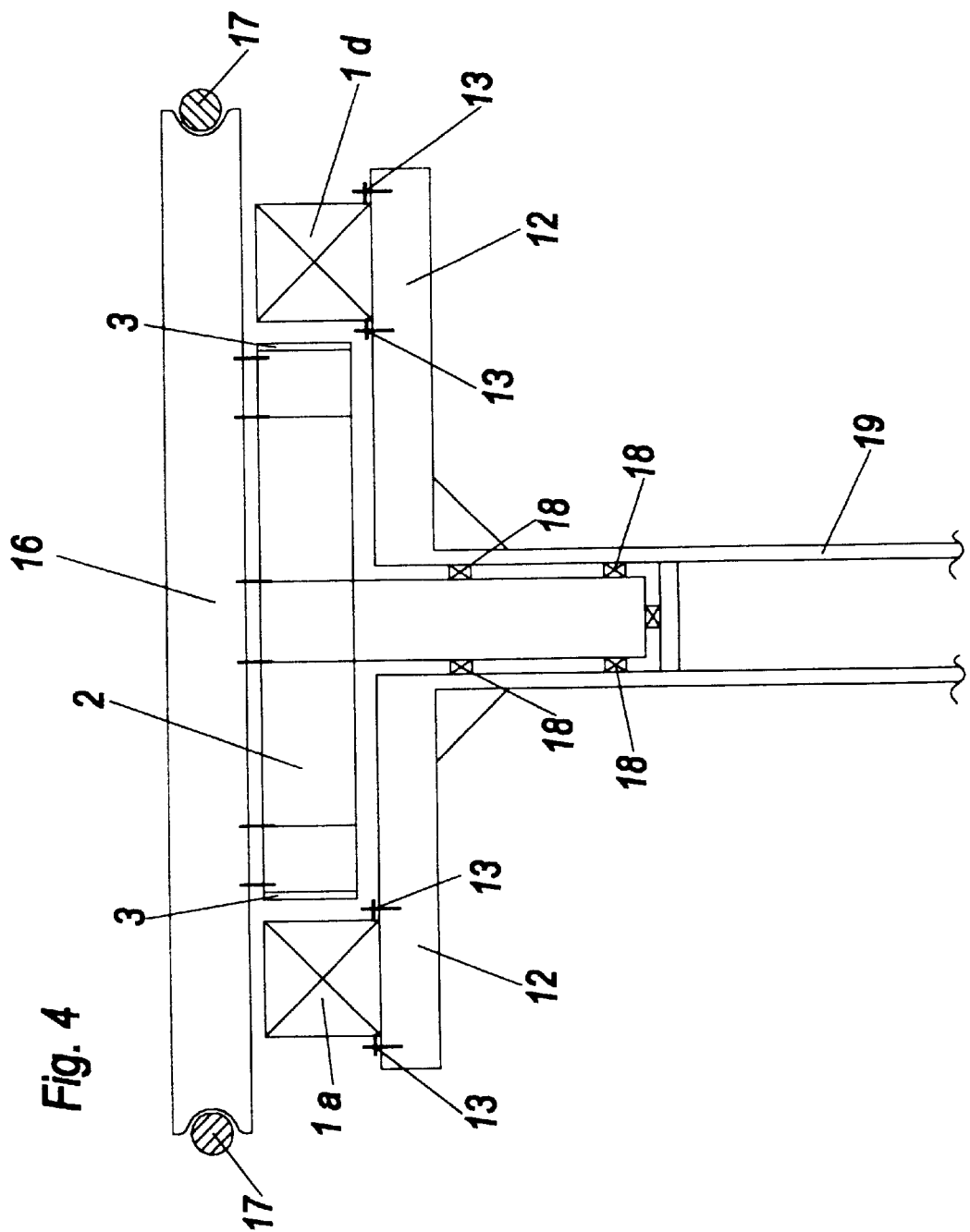
FIG. 4 is a view in vertical longitudinal section of an embodiment of the electric motor according to the invention for driving a cable pulley.

FIG. 4 shows the use of an electric motor according to the invention for driving a cable pulley 16 having a groove in which a conveyor cable 17 is guided therearound. The cable pulley 16 is directly non-rotatably connected to the rotor 2 of the electric motor which at its peripheral surface carries permanent magnets 3 of alternate polarity. In principle it would also be possible to use here electromagnets instead of the permanent magnets 3. The rotor 2 is rotatably supported in bearings 18 in a support structure 19. The stator is made up of individual stator segments, for example six thereof, as in FIG. 1. These stator segments of which only two, namely 1a and 1d are visible, are connected by way of screw connections to a stationary carrier 12. It will be appreciated that it is also possible to envisage structural configurations in which the stator is on the inside and the rotor is on the outside. The cable pulley can preferably (but not exclusively) drive a cable of a cableway or other lift system, for example a chair lift or a drag lift.

What is claimed is:

1. An electric motor comprising:
   a stationary annular stator having wound stator poles and a rotatably mounted rotor having annularly distributed permanent magnets or electromagnets of alternate polarity, wherein the stator comprises a plurality of separate stator segments each having its own three-phase current connections, wherein each stator segment has a multi-pole and multi-phase configuration and is fed by way of its current connections from its own frequency converter, each frequency converter having a control portion and a power portion, wherein the control portions are connected in a master-slave function and each control portion by way of its own power portion actuates the respectively associated stator segment.

2. An electric motor comprising:
   a stationary annular stator having wound stator poles and a rotatably mounted rotor having annularly distributed permanent magnets or electromagnets of alternate polarity, wherein the stator comprises a plurality of separate stator segments each having its own three-phase current connections, wherein each stator segment has a multi-pole and multi-phase configuration and is fed by way of its current connections from its own frequency converter;
   a feed line between each frequency converter and stator segment; and
   a relay arranged in each feed line.

3. An electric motor comprising:
   a stationary annular stator having wound stator poles and a rotatably mounted rotor having annularly distributed permanent magnets or electromagnets of alternate polarity, wherein the stator comprises a plurality of separate stator segments each having its own three-phase current connections, wherein each stator segment has a multi-pole and multi-phase configuration and is fed by way of its current connections from its own frequency converter; and
   an electronic monitoring system for detecting and displaying the failure of one of the stator segments.

4. A cable drive, in particular for a cableway or a lift arrangement, comprising:
   an electric motor, the electric motor comprising a stationary annular stator having wound stator poles and a rotatably mounted rotor having annularly distributed permanent magnets or electromagnets of alternate polarity, wherein the stator comprises a plurality of separate stator segments each having its own three-phase current connections, wherein each stator segment has a multi-phase configuration and is fed by way of its current connections from its own frequency converter; and a cable guide pulley, wherein the pulley is driven by the electric motor.

5. The cable drive of claim 4, wherein each stator segment of the electric motor has a multi-pole configuration wherein the winding lines are passed in series over at least two poles.

6. The cable drive of claim 5, wherein the winding lines are passed in parallel over at least two poles.

7. The cable drive of claim 4, wherein each stator segment of the electric motor forms the stator of its own permanently excited synchronous machine.

8. The cable drive of claim 4, wherein each frequency converter of the electric motor has a control portion and a power portion, wherein the control portions are connected in a master-slave function and each control portion by way of its own power portion actuates the respectively associated stator segment.

9. The cable drive of claim 4, wherein the electric motor further comprises a feed line between each frequency converter and stator segment, and a relay arranged in each fee line.

10. The cable drive of claim 4, wherein the electric motor further comprises an electronic monitoring system for detecting and displaying the failure of one of the stator segments.

11. The cable drive of claim 4, wherein the electric motor has between three and ten stator segments.

12. The cable drive of claim 11, wherein the electric motor has between four and six stator segments.

13. The cable drive of claim 4, wherein the stator segments of the electric motor are arranged in a substantially closed stator ring.

14. The cable drive of claim 4, wherein the cable guide pulley itself or a member non-rotatably connected thereto is in the form of the rotor of the electric motor.

15. The cable drive of claim 4, wherein the electric motor drives the cable guide pulley by way of a transmission.

16. A cable drive, in particular for a cableway or a lift arrangement, comprising:

an electric motor, the electric motor comprising a stationary annular stator having wound stator poles and a rotatably supported rotor, wherein the stator comprises a plurality of separate stator segments each having its own current connections, wherein the stator segments are each in the form of separate modular structural units which are releasably fixed independently of each other to a stator carrier; and a cable guide pulley, wherein the pulley is driven by the electric motor.

17. The cable drive of claim 16, wherein the stator of the electric motor comprises a plurality of separate stator segments each having its own three-phase current connections, wherein each stator segment has a multi-pole and multi-phase configuration and is fed by way of its current connections from its own frequency converter.

18. The cable drive of claim 16, wherein the cable guide pulley itself or a member non-rotatably connected thereto is in the form of the rotor of the electric motor.

19. The cable drive of claim 16, wherein the electric motor drives the cable guide pulley by way of a transmission.

* * * * *